United States Patent
Boyd et al.

[15] 3,636,545
[45] Jan. 18, 1972

[54] OVERSPEED DETECTION SYSTEM

[72] Inventors: William R. Boyd, Oakland; Robert C. Franklin, San Jose, both of Calif.

[73] Assignee: Beckman Instruments, Inc.

[22] Filed: Apr. 1, 1969

[21] Appl. No.: 811,803

[52] U.S. Cl. .................. 340/263, 235/132 E, 235/151.32, 317/19, 328/74, 340/271, 340/419, 340/168
[51] Int. Cl. ............................................. G08b 21/00
[58] Field of Search .................. 340/263, 268, 271, 267, 53, 340/62; 324/70, 161; 328/74, 75; 317/19; 235/151.3, 151.32, 132 E, 150.2; 180/106

[56] References Cited

UNITED STATES PATENTS

| | | | |
|---|---|---|---|
| 2,521,774 | 9/1950 | Bliss | 328/74 X |
| 2,896,845 | 7/1959 | Hansen et al. | 340/263 UX |
| 3,024,443 | 3/1962 | Barker et al. | 340/263 X |
| 3,182,648 | 5/1965 | Schneider et al. | 317/19 X |
| 3,215,918 | 11/1965 | Lichowsky | 324/70 UX |
| 3,267,381 | 8/1966 | Thornberg et al. | 328/74 X |
| 3,500,375 | 3/1970 | Klimo | 340/268 |
| 3,505,804 | 4/1970 | Hofstein | 340/267 X |
| 3,036,290 | 5/1962 | Zarouni | 235/132 X |
| 3,221,166 | 11/1965 | Allenden | 250/83.3 |

Primary Examiner—David L. Trafton
Attorney—Richard M. Jennings and Robert J. Steinmeyer

[57] ABSTRACT

A system for sensing an overspeed condition which may exist in a rotating device such as a centrifuge. The system receives, as its inputs, a train of pulses, each pulse indicative of a predetermined number of revolutions of the rotating device. The system functions as an events per-unit-time counter, counting the input pulse rate for a given interval of time with the total pulse count representing the desired speed if the rotating device is onspeed. If the device exceeds the desired speed by a predetermined percentage, the system is activated to indicate an overspeed condition and automatically remove power from the rotating device drive circuits. To prevent premature shutdown of the rotating device by spurious triggering signals, a time delay circuit requires that the overspeed condition exist for a predetermined time interval before system shutdown is accomplished.

22 Claims, 1 Drawing Figure

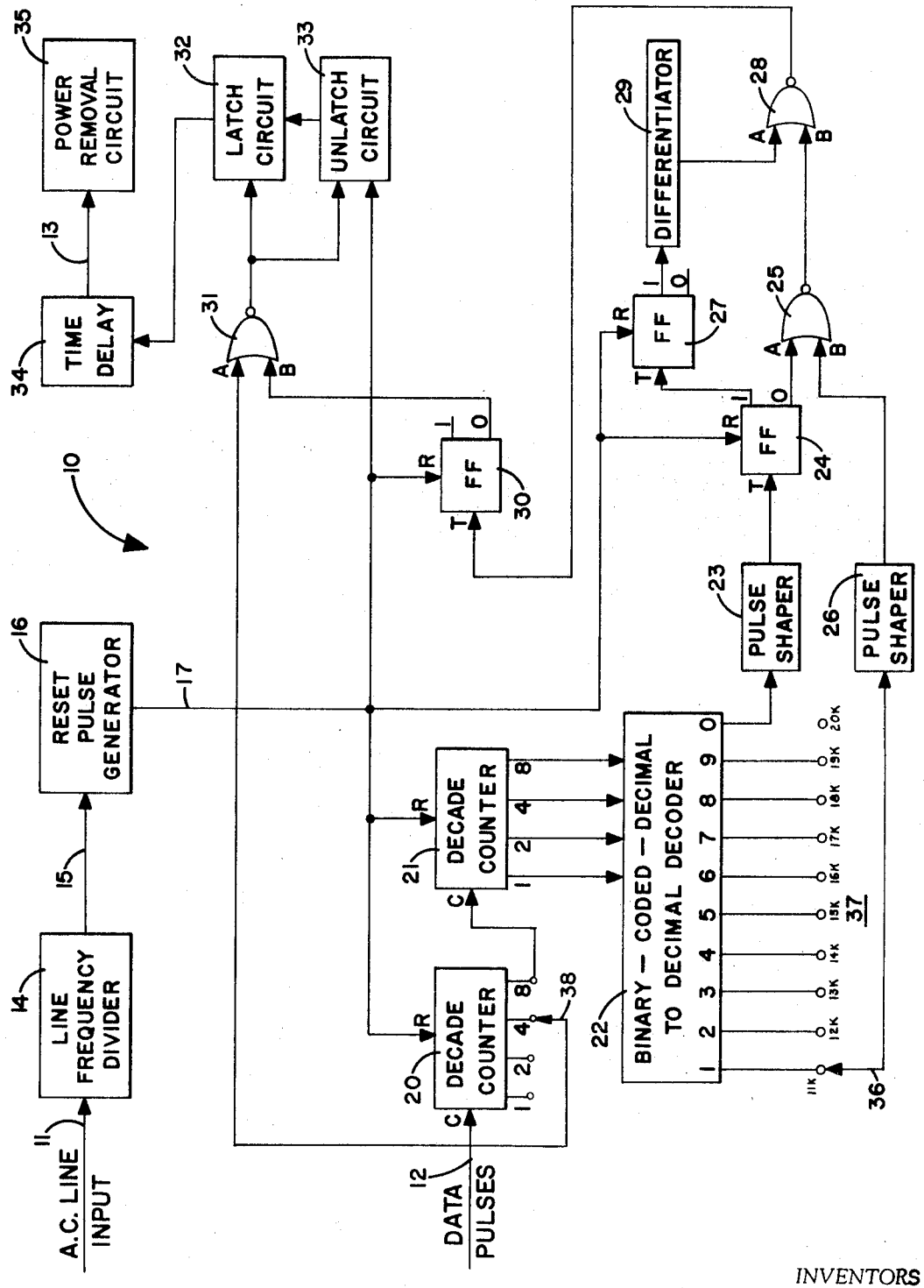

OVERSPEED DETECTION SYSTEM

BACKGROUND OF THE INVENTION

1. Field of the Invention

The present invention relates to an overspeed detection and shutdown system and, more particularly, to a system for sensing when the speed of a rotating device exceeds a desired speed by a predetermined percentage and for automatically removing drive power from the rotating device when this occurs.

2. Description of the Prior Art

The present system has been designed for use with a centrifuge and particularly for use with ultracentrifuges which utilize high rotative speeds on the order of 10,000 to 80,000 r.p.m. or more. However, it should be emphasized that the present system may be used to sense a potentially hazardous overspeed condition which may exist in any type of rotating device, especially one that is selected in discrete steps by a speed or frequency selector.

In high-speed ultracentrifuges, it is not possible to design the rotors with a factor of safety as high as might normally be considered good engineering practice and, therefore, it is necessary to guard against excessive rotative speeds. For example, if a rotor is designed to operate at a maximum speed of 20,000 r.p.m., excessive speed on the order of 25,000 r.p.m. may cause bursting of the rotor with resulting damage to other parts of the equipment and possible injury to the attendant.

Providing an overspeed detection system for an ultracentrifuge is especially difficult since the rotor drive is usually arranged to make available any one of many possible speeds of rotation so that the system must govern or regulate any one of the speeds selected.

Initially, essentially all ultracentrifuges utilized a mechanical overspeed shutdown system. Such system generally included a frangible element which was disposed in the rotor at a location radially displaced from the rotatable axis of the centrifuge, which element was designed to break under a predetermined load caused by the centrifugal force developed when the rotor exceeded its maximum safe speed. Upon breaking, the frangible element travelled in a radially outward direction to strike a switch element thereby breaking the electrical circuit which provided power to the drive motor.

Frangible elements which break under tension as well as those which break under shear have been employed. By way of example, U.S. Pat. Nos. 2,666,572, and 3,101,322, illustrate typical mechanical overspeed shutdown systems as presently used. However, while such systems are generally useful in achieving the desired result, all mechanical overspeed shutdown systems suffer from at least one serious problem. This problem is the relatively large spread of breaking loads from one frangible element to the next, making it, practically speaking, impossible to manufacture elements which will repeatedly break within narrowly defined rotational speed limits.

Because of this disadvantage inherent in all mechanical overspeed shutdown systems, it has been suggested to use electrical shutdown systems. A typical electrical overspeed shutdown system includes a transducer for providing an output signal whose frequency is a function of the rotational speed of the centrifuge rotor, a reference signal generator, and a mixer for mixing the derived output signal with the frequency standard from the reference signal generator to provide a difference frequency signal. A low-pass filter coupled to the output of the mixer passes the difference frequency signal when it falls below a predetermined frequency indicative of the rotor speed increasing above a predetermined level. The signal passed by the low-pass filter is impressed upon a power removal circuit such as the gating electrode of a silicon controlled rectifier to disconnect drive power from the centrifuge rotor.

While such electrical overspeed shutdown systems are an improvement over mechanical systems in that they can more accurately remove power from the centrifuge rotor as soon as the rotational speed reaches a predetermined level, there are other problems associated therewith. More specifically, many of the present electrical shutdown systems are incapable of operating over a wide range of rotor speeds. In addition, most electrical systems are subject to premature shutdown due to spurious triggering signals or very brief periods of overspeed.

SUMMARY OF THE INVENTION

According to the present invention, there is provided a completely digital system which provides continuous speed monitoring for any desired rotational speed range and is operative to sense a potentially hazardous overspeed condition which may exist. Overspeed conditions, in excess of 2 to 4 percent of the selected speed, which continue for more than a predetermined time interval, such as 5 seconds, will cause removal of all drive power from the rotating device. The present system may be used to monitor the speed of a rotating device over a wide range and to permit selection of the permissible percentage overspeed. In addition, by providing a time delay circuit which requires the overspeed condition to exist for a predetermined time interval, premature shutdown due to spurious triggering signals or only momentary overspeed conditions, is prevented.

Briefly, the present overspeed detection system receives a train of data pulses wherein each pulse is indicative of a predetermined number of revolutions of a rotating device. The system functions as an events per-unit-time counter to measure the number of pulses occurring during a given interval of time, with the total pulse count representing the desired speed if the control system is indeed onspeed. If an overspeed condition occurs, the number of pulses per given interval of time exceeds the onspeed count. To establish the allowable overspeed percentage, the counting circuits are permitted to count a predetermined number of pulses over and above the onspeed count, this predetermined number of pulses being selectable to adjust the allowable percentage overspeed. When this overspeed count continues for 5 seconds, the power is removed from the rotor drive circuitry.

It is, therefore, an object of the present invention to provide an electrical overspeed detection and shutdown system.

It is a further object of the present invention to provide a completely digital overspeed detection circuit which provides continuous speed monitoring over a wide range of speeds.

It is a still further object of the present invention to provide an overspeed detection and shutdown system which provides for an adjustable allowable overspeed percentage.

It is another object of the present invention to provide an overspeed detection and shutdown system which prevents premature shutdown by requiring the overspeed condition to exist for a given time interval.

Still other objects, features and attendant advantages of the present invention will become apparent to those skilled in the art from a reading of the following detailed description of the preferred embodiment constructed in accordance therewith, taken in conjunction with the accompanying drawings.

BRIEF DESCRIPTION OF THE DRAWINGS

The sole FIGURE is a block diagram of the present overspeed detection and shutdown system.

DESCRIPTION OF THE PREFERRED EMBODIMENT

Referring now to the drawings, the present overspeed detection and shutdown system, generally designated 10, receives first and second input signals over lines 11 and 12, respectively, and generates an output signal over a line 13. The first input signal is an AC line signal which is utilized to establish a reference time interval for the overspeed counting circuits. More specifically, the AC line signal is applied over line 11 to a line frequency divider circuit 14 which divides the input sine wave by an appropriate factor and generates an output signal on a line 15 whose period is, for example, 0.1 second. This requires a division by 5 for a 50-Hz. input signal and by 6 for a 60-Hz. input signal. This output signal on line 15 is applied to a reset pulse generator 16 which generates a pulse on a line 17 for each cycle of the output signal from divider 14. These pulses, which occur every 0.1 second, establish the reference time interval for the overspeed counting circuit.

The second input signal is a train of data pulses, each pulse indicative of a predetermined number of revolutions of the rotating device under control. Such data pulses may be derived in any one of many possible ways. For example, a photo pickup device and disc mounted on the rotating device drive motor may be utilized to generate a pulse for each revolution of the rotating device. These pulses, the frequency of which may be divided such that one pulse per second represents 10 r.p.m., are applied over line 12 to the count input C of a decade counter 20 whose outputs are coded in the familiar 1–2–4–8 binary-coded-decimal form. The "8" output of decade counter 20 produces a positive going transition for each 10 input pulses. This positive transition is coupled to the count input C of a second decade counter 21. The "1," "2," "4" and "8" outputs of decade counter 21 are coupled to a binary-coded-decimal to decimal decoder 22 which produces output signals at its terminals 0 through 9 as a function of the input pulses received from decade counter 21. More specifically, for every 10 data pulses at count input C of decade counter 20, decade counter 21 shifts one count. Likewise, each change of the count of decade counter 21 produces a corresponding change in the output of decoder 22. With decade counter 21 reset to zero, a 0 output signal appears at the "0" output of decoder 22 and a 1 output signal appears at the remaining outputs of decoder 22. When decade counter 21 advances one count, decoder 22 advances one count by dropping the appropriate decimal output to 0. Accordingly, after 10 data pulses, the "1" output of decoder 22 goes from 1 to 0, after 20 data pulses, the "2" output of decoder 22 goes from 1 to 0, etc. After 100 data pulses, the "0" output of decoder 22 goes to 0. This transition at the "0" output of decoder 22 is coupled by a pulse shaper 23 to the trigger input T of a flip-flop multivibrator 24. The "0" output of flip-flop 24 is coupled to the A-input of a NOR-gate 25 which receives, at its B-input, the signal from one of terminals 1 through 9 of decimal decoder 22 via an arm 36 of a speed selector switch 37 and a pulse shaper 26. The "1" output of flip-flop 24 is coupled to the trigger input T of a flip-flop multivibrator 27, the "1" output of which is applied to the A-input of a NOR-gate 28 via a differentiator 29. NOR-gate 28 receives, at its B-input, the output of NOR-gate 25.

The output of NOR-gate 28 is applied to the trigger input T of a flip-flop multivibrator 30, the "0" output of which is applied to the B-input of a NOR-gate 31. NOR-gate 31 receives, at its A-input, the "4" output of decade counter 20. The output of NOR-gate 13 is applied to the inputs of a latch circuit 32 and an unlatch circuit 33, the output of unlatch circuit 33 also being applied to latch circuit 32. The output of latch circuit 32 is applied to a time delay circuit 34 which provides the output of the present overspeed detection and shutdown system over line 13. The signal on line 13 is applied to a power removal circuit 35 which removes the power to the rotating device when triggered. Finally, the output pulses from reset pulse generator 17, which occur every 0.1 seconds, are applied to the reset inputs R of decade counter 20 and 21, flip-flops 24, 27 and 30, and unlatch circuit 33.

In operation, in order to follow the overspeed sequence, first assume that a reset pulse has just occurred and that all the appropriate circuits are starting from their reset or 0 count condition. Also assume that the present circuit is being used to monitor the speed of an ultracentrifuge for any speed from 11,000 to 20,000 r.p.m., which speed is selectable by adjusting the position of arm 36 to any one of the 1 through 0 outputs of decoder 22. For any selected rotor speed, the pulse rate (in pulses per second) is one-tenth of the rotor speed (in r.p.m.). Accordingly, a speed of 11,000 r.p.m. produces a data rate of 1,100 pulses per second, a speed of 12,000 r.p.m. produces a data rate of 1,200 pulses per second, etc.

The present overspeed circuit measures the number of pulses occuring during a 0.1 second time interval. If an overspeed condition were occurring, the number of pulses per 0.1 seconds would exceed the onspeed count. The onspeed count is, evidently, 110 pulses per 0.1 seconds for a selected speed of 11,000 r.p.m., 120 pulses per 0.1 seconds for a selected speed of 12,000 r.p.m., etc. To establish the allowable overspeed percentage, the present counting circuits permit a pulse count of 4 more than the onspeed count or 114 pulses at 11,000 r.p.m. and 204 pulses at 20,000 r.p.m. This represents approximately 3.5 percent overspeed at 11,000 r.p.m. and 2 percent overspeed at 20,000 r.p.m. Finally, assume that arm 36 of speed selector switch 37 is in the 11,000 r.p.m. position.

If the centrifuge is running at 11,000 r.p.m., the data rate will be 1,100 p.p.s. or 110 pulses per 0.1 seconds. As every 10th input pulse is counted by decade counters 20 and 21, decimal decoder 22 will advance one count. After 100 input pulses, the "0" output of decoder 22 undergoes a 1-to-0 transition. This transition is coupled through pulse shaper 23 to toggle flip-flop 24 to its "set" condition. Since flip-flop 24 had been previously reset by a pulse over line 17 from reset pulse generator 16, a 0 now appears at the "0" output and a 1 now appears at the "1" output. It should be noted that prior to flip-flop 24 being toggled by the 100th data pulse, the 1 at the "0" output of flip-flop 24 operates as a disabling voltage for gate 25 causing the output thereof to remain low. Therefore, when the 1-to-0 transition occurs at the "1" output of decoder 22 after 10 pulses have been counted, this transition is prevented from passing through gate 25.

After 100 data pulses, however, flip-flop 24 is toggled causing a 0 to appear at the "0" output thereof, thereby removing the disabling voltage at the A-input to gate 25. After 110 data pulses have occurred, a 1-to-0 transition occurs at the "1" output of decoder 22. This transition is coupled through arm 36 and pulse shaper 26 to the B-input of gate 25. A positive pulse will now appear at the output of gate 25 which will be coupled to the B-input of gate 28. Accordingly, a negative pulse will be applied to the trigger input T of flip-flop 30 thereby toggling flip-flop 30 to its "set" condition where a 0 appears at the "0" output thereof. It should be noted that prior to this time, a 1 appeared at the "0" output of flip-flop 30 due to flip-flop 30 being reset by a pulse over line 17 from reset pulse generator 16. This 1, which was applied to the B-input of NOR-gate 31, was holding the output of gate 31 at a low level and thus inhibiting any pulses at the A input thereof from passing therethrough. However, with the inhibiting voltage removed from the B input terminal of gate 31, the next pulse which arrives at the A input of gate 31 passes through. Since the A input of gate 31 is received from the "4" output of decade counter 20, the next pulse arrives at the A input of gate 31 at the 114 data pulse time. This would represent an approximate 3.5 percent overspeed condition. However, if the centrifuge is operating below this overspeed condition, a reset pulse from generator 16 will occur over line 17 prior to a pulse at input A of gate 31. Therefore, this reset pulse will reset flip-flop 30 which will again inhibit gate 31. The remaining circuits will also be reset and the counting sequence will repeat.

In the event an overspeed condition exists, the 114th pulse will be impressed via gate 31 on latch circuit 32. Latch circuit 32 activates time delay 34 which begins a 5-second timing period. If the overspeed condition persists for more than 5 seconds, power removal circuit 35 is activated and the centrifuge drive power is removed.

Each time a pulse is applied by gate 31 to latch circuit 32, the same pulse is applied to unlatch circuit 33 so that a subsequent reset pulse after the 114th pulse cannot operate unlatch circuit 33. However, if during the 5-second time out, a reset pulse over line 17 occurs before a pulse from gate 31 indicating that the centrifuge has dropped below its overspeed condition, unlatch circuit 33 will reset latch circuit 32 disabling time delay 34 and allowing the centrifuge to continue to operate.

For each successively higher speed, the number of input pulses counted increases for the given 0.1-second time interval, i.e., 12,000 r.p.m. = 120 pulses, etc. Therefore, the circuit may be utilized to monitor any speed from 11,000 to 20,000 r.p.m. by simply changing the position of arm 36 of speed selector switch 37. Furthermore, it should be noted that as the selected speed pulse count increases, the overspeed percentage decreases, where percent overspeed equals:

$$\frac{4}{\text{Selected speed pulse count} + 4} \times 100\%$$

However, the allowable overspeed percentage may be changed by simply switching the movable arm 38 connected to the signal output line leading to the A-input of gate 31 to any of the 1–2–4–8 outputs of decade counter 20.

At 20,000 r.p.m., a special condition exists where 200 input pulses must be counted over the 0.1 second interval. To accommodate this situation, arm 36 of speed selector 37 is left open at the 20 K position thus coupling no pulses to the B-input of gate 25. Instead, after the first 100 data pulses, flip-flop 24 toggles, as normal, and a 1 appears at its "1" output. Even though the disabling voltage from gate 25 is now removed, no signal will pass therethrough since arm 36 is left open.

After the second 100 pulses, a 1-to-0 transition will again be coupled through pulse shaper 23 to flip-flop 24 which will now be toggled back to its original state. The 1-to-0 transition at the "1" output of flip-flop 24, however, toggles flip-flop 27 to its "set" condition. The 0-to-1 transition at the "1" output of flip-flop 27 is differentiated by differentiator 29 so that a positive pulse is applied to the A-input of gate 28. This positive pulse at the A-input of gate 28 accomplishes the same function as the positive pulse which normally occurs at the B-input of gate 28 so that flip-flop 30 is toggled and the sequence continues as described previously.

While the invention has been described with respect to a preferred physical embodiment constructed in accordance therewith, it will be apparent to those skilled in the art that various modifications and improvements may be made without departing from the scope and spirit of the invention. For example, although the present circuit has been described as capable of monitoring the speed of a rotating device for any speed from 11,000 to 20,000 r.p.m., it will be obvious to those skilled in the art that this operating range can be extended to higher speeds which are multiples of the existing speed selector positions. In other words, by simply reducing the primary data rate by a multiple integer prior to applying it to the input of decade counter 20, the speed range may be multiplied by the same integer. For example, a speed range of 22,000 to 40,000 r.p.m. could be accomplished by dividing the primary data rate (2,200 to 4,000 pulses per 0.1 seconds) by two, thereby leaving a data rate of 1,100 to 2,000 pulses per 0.1 seconds at the input of decade counter 20. Furthermore, by dividing the primary data rate by four, a speed range of 44,000 to 80,000 r.p.m. may be accommodated.

We claim:

1. An overspeed detection system responsive to pulses indicative of a known number of revolutions of a rotating device comprising:
   means for counting the number $x$ of said pulses occurring during a given time interval;
   means for generating an output signal when the equation
   $$x \geq y + z$$
   is satisfied during said given time interval where $y$ = a total pulse count representing the desired speed of said rotating device and $z$ = an additional pulse count representing an allowable overspeed;
   utilization means responsive to said output signal for removing power from said rotating device when $x \; y+z$;
   time delay means for delaying the application of said output signal to said utilization means for a predetermined time interval; and
   means for preventing application of said output signal to said utilization means when the equation
   $$x < y + z$$
   is satisfied during said predetermined time interval.

2. An overspeed detection system according to claim 1 further comprising:
   means for adjusting the value of $y$ whereby said system is operative to monitor the speed of said rotating device over a wide range.

3. An overspeed detection system according to claim 2 further comprising:
   means for adjusting the value of $z$ to vary the allowable overspeed.

4. An overspeed detection system according to claim 3 wherein said counting means comprises:
   a decade counter responsive to said pulses and operative to generate an incrementing signal for each 10 pulses; and
   a decoder having a plurality of outputs and responsive to said incrementing signal for generating a characteristic signal at a different one of said outputs after each 10 pulses.

5. An overspeed detection system responsive to pulses indicative of a known number of revolutions of a rotating device comprising:
   means for counting the number $x$ of said pulses occurring during a given time interval, said counting means comprising:
   a decade counter having a plurality of outputs and responsive to said pulses for generating a signal at a different one of said outputs after each 1, 2, 4 and 8 pulses and generating an incrementing signal for each 10 pulses; and
   a decoder having a plurality of outputs and responsive to said incrementing signal for generating a characteristic signal at a different one of said outputs after each 10 pulses;
   means for determining whether the equation
   $$x \geq y + z$$
   is satisfied during said given time interval where $y$ = a total pulse count representing the desired speed of said rotating device and $z$ = an additional pulse count representing an allowable overspeed, said determining means being responsive to one of said outputs of said decade counter and at least one of said outputs of said decoder;
   means for adjusting the value of $y$ whereby said system is operative to monitor the speed of said rotating device over a wide range; and
   means for adjusting the value of $z$ to vary the allowable overspeed.

6. An overspeed detection system according to claim 5 wherein said means for adjusting the value of $y$ comprises:
   manually operable means for selecting one of said outputs of said decoder for application to said determining means.

7. An overspeed detection system according to claim 5 wherein said means for adjusting the value of $z$ comprises:
   means for selecting one of said outputs of said decade counter for application to said determining means.

8. An overspeed detection and shutdown system responsive to a train of first pulses and a train of second pulses, each of said first pulses indicative of a known number of revolutions of a rotating device, the interval between said second pulses defining a given time interval, comprising:
   means responsive to the number of said first pulses occurring during said given time interval reaching a count indicative of an onspeed condition for generating an actuating signal; and
   means operative after the occurrence of said actuating signal for determining whether a predetermined number of additional first pulses or a second pulse occurs first and for generating an overspeed signal to shut down said rotating device when said predetermined number of additional first pulses occurs first.

9. An overspeed detection and shutdown system according to claim 8 wherein said actuating signal generating means includes:
   means for selecting the value of said count indicative of an onspeed condition whereby said system is operative to monitor the speed of said rotating device over a wide range.

10. An overspeed detection and shutdown system according to claim 8 wherein said determining means includes:
means for selecting the value of said predetermined number of additional first pulses to vary the allowable overspeed.

11. An overspeed detection and shutdown system according to claim 8 further comprising:
means for delaying the generation of said overspeed signal for a predetermined time interval.

12. An overspeed detection and shutdown system according to claim 11 further comprising:
means operative after the occurrence of a subsequent actuating signal for determining whether a second pulse occurs before said predetermined number of additional first pulses during said predetermined time interval for preventing generation of said overspeed signal.

13. An overspeed detection and shutdown system responsive to a train of first pulses and a train of second pulses, each of said first pulses indicative of a known number of revolutions of a rotating device, the interval between said second pulses defining a given time interval, comprising:
a counter having a plurality of output terminals coded in 1–2–a'–8 binary form for counting said first pulses;
a binary-to-decimal decoder having a plurality of output terminals and connected to one of said output terminals of said counter for generating a characteristic signal at each of its output terminals indicative of the count in said counter, said counter and said decoder being reset to zero by said second pulses:
first logic means connected to at least one of said output terminals of said decoder for generating an actuating signal when the number of counted first pulses reaches a predetermined number indicative of an onspeed condition; and
second logic means connected to one of said output terminals of said counter and being enabled by said actuating signal for generating an overspeed signal to shut down said rotating device when the number of said first pulses occurring after said actuating signal reaches a predetermined number indicative of an allowable overspeed, said second pulses being applied to said first logic means to reset said first logic means thereby disabling said second logic means and preventing generation of said overspeed signal.

14. An overspeed detection and shutdown system according to claim 13 further comprising:
switch means connected between said output terminals of said decoder and said first logic means for selecting one of said output terminals for connection to said first logic means so as to select said predetermined number of counted first pulses indicative of an onspeed condition whereby said system is operative to monitor the speed of said rotating device at any selected speed.

15. An overspeed detection and shutdown system according to claim 13 wherein said second logic means may be connected to any one of said output terminals of said counter to select said predetermined number of first pulses indicative of an allowable overspeed so as to vary said allowable overspeed.

16. An overspeed detection and shutdown system according to claim 13 further comprising: —p1 time delay means connected to the output of said second logic means for delaying the generation of said overspeed signal for a predetermined time interval.

17. An overspeed detection and shutdown system according to claim 16 further comprising:
third logic means connected between said second logic means and said time delay means for determining whether the number of said first pulses occurring after said actuating signal is less than said predetermined number indicative of an allowable overspeed during said predetermined time interval for preventing generation of said overspeed signal.

18. An overspeed detection and shutdown system according to claim 13 wherein said first logic means comprises:
a first bistable multivibrator having a trigger input terminal and "1" and "0" terminals, said trigger input terminal being connected to the one of said output terminals of said decoder which indicates multiples of 100 counted first pulses, said first multivibrator being "set" when the number of counted first pulses reaches 100, and first multivibrator being reset by said second pulses;
first gate means having first and second input terminals and an output terminal, said "0" output terminal of said first multivibrator being connected to said first input terminal of said first gate means, said first gate means being inhibited when said first multivibrator is reset and being open when said first multivibrator is set; and
switch means connected to said second input terminal of said first gate means, said switch means being operative to connect any selected one of said output terminals of said decoder to said first gate means, said decoder generating a characteristic signal at a different one of said output terminals after each 10 first pulses whereby said first logic means generates said actuating signal when the number of first pulses is a decade value within the range 110 to 190 depending upon which of said output terminals of said decoder is connected to said second input terminal of said first gate means.

19. An overspeed detection and shutdown system according to claim 18 wherein said first logic means further comprises:
a second bistable multivibrator having a trigger input terminal connected to said output terminal of said first gate means, said second multivibrator being set by the output of said first gate means and being reset by said second pulses, said second multivibrator generating said actuating signal when set.

20. An overspeed detection and shutdown system according to claim 19 wherein said second logic means comprises:
second gate means having first and second input terminals and an output terminal, said actuating signal being applied to said first input terminal of said second gate means, said second gate means being inhibited when said second multivibrator is reset and being open when said second multivibrator is set, said one of said output terminals of said counter being connected to said second input terminal of said second gate means, said second gate means generating said overspeed signal at said output terminal.

21. An overspeed detection and shutdown system according to claim 20 further comprising:
time delay means connected to said output terminal of said second gate means for delaying the generation of said overspeed signal for a predetermined time interval.

22. An overspeed detection and shutdown system according to claim 21 further comprising:
third logic means connected between said output terminal of said second gate means and said time delay means for determining whether the number of said first pulses occurring after said actuating signal is less than said predetermined number indicative of an allowable overspeed during said predetermined time interval for preventing generation of said overspeed signal.

* * * * *

PO-1050
(5/69)

UNITED STATES PATENT OFFICE
CERTIFICATE OF CORRECTION

Patent No. 3,636,545          Dated January 18, 1972

Inventor(s) William R. Boyd and Robert C. Franklin

It is certified that error appears in the above-identified patent and that said Letters Patent are hereby corrected as shown below:

Column 5, Cl. 1, line 68 -- the formula should read -- $x \geq y+z$ --

Column 7, Cl. 13, line 22 --change "1-2-a'-8" -- to read -- 1-2-4-8 --

Column 7, Cl. 16, line 59 -- Delete "--pl" --

Column 8, Cl. 18, line 13 -- change -- "and" -- to read -- said --

Signed and sealed this 6th day of June 1972.

(SEAL)
Attest:

EDWARD M. FLETCHER, JR.　　　　　　　ROBERT GOTTSCHALK
Attesting Officer　　　　　　　　　　　Commissioner of Patents